United States Patent [19]

Braun et al.

[11] 4,396,495

[45] Aug. 2, 1983

[54] REDUCTION OF FOAMING IN A SLURRY CATALYST HYDROCARBON CONVERSION PROCESS

[75] Inventors: Richard Braun, Buffalo Grove; Russell W. Johnson, Villa Park, both of Ill.

[73] Assignee: UOP Inc., Des Plaines, Ill.

[21] Appl. No.: 342,523

[22] Filed: Jan. 25, 1982

[51] Int. Cl.³ .............................................. C10G 47/00
[52] U.S. Cl. .................................... 208/112; 208/108
[58] Field of Search ........................ 208/112, 131, 108

[56] References Cited

U.S. PATENT DOCUMENTS

| | | | |
|---|---|---|---|
| 3,498,908 | 3/1970 | Frankovich | 208/112 |
| 3,617,503 | 11/1971 | Rogers et al. | 208/97 |
| 3,622,498 | 11/1971 | Stolfa | 208/108 |
| 3,700,587 | 10/1972 | Hyde | 208/131 |
| 4,176,047 | 11/1979 | Orrell et al. | 208/51 |
| 4,329,528 | 5/1982 | Evans | 585/3 |

*Primary Examiner*—Delbert E. Gantz
*Assistant Examiner*—O. Chaudhuri
*Attorney, Agent, or Firm*—James R. Hoatson, Jr.; John G. Cutts, Jr.; William H. Page, II.

[57] ABSTRACT

A catalytic slurry process for effecting the conversion of a hydrocarbonaceous black oil charge stock is disclosed and which process possesses improved efficiency by the addition of antifoamant.

6 Claims, No Drawings

REDUCTION OF FOAMING IN A SLURRY CATALYST HYDROCARBON CONVERSION PROCESS

BACKGROUND OF THE INVENTION

The process described herein is applicable to the conversion of petroleum crude oil residuals having high metal content and an asphaltene fraction. More specifically, our invention is directed toward a method for effecting a catalytic slurry process, in the presence of hydrogen, in order to convert hydrocarbonaceous feedstocks, such as, atmospheric tower bottoms, vacuum column bottoms, crude oil residuals, topped and/or reduced crude oils, coal oil extracts, shale oils, deasphalter pitch, crude oils extracted from tar sands, etc., all of which are commonly referred to in the art as "black oil."

Petroleum crude oils, and particularly the heavy residuals derived therefrom, contain sulfurous compounds in exceedingly large quantities, nitrogenous compounds, high molecular weight organometallic complexes principally comprising nickel and vanadium as the metallic component and asphaltenic material. The latter is generally found to be complexed with sulfur, and, to a certain extent, with the metallic contaminants. A black oil is generally characterized in petroleum technology as a heavy hydrocarbonaceous material of which more than about 10 volume percent boils above a temperature of about 1,050° F. (referred to as nondistillables) and which further has a gravity generally less than about 20.0° API. Sulfur concentrations are usually high, most often in the range of about 2 to about 6 weight percent. Conradson carbon residual factors exceed 1.0 percent by weight and the concentration of metals can range from as low as about 10 ppm to as high as about 2000 ppm by weight or more.

The process encompassed by the present invention is particularly directed toward the conversion of those black oils contaminated by large quantities of asphaltenes and having a high metals content—i.e. containing more than about 10 ppm by weight. Specific examples of the charge stocks to which our invention is adaptable include a vacuum tower bottoms product having a gravity of 7.1° API and containing 4.1 percent by weight of sulfur and 23.7 percent by weight of heptane-insoluble materials; a "topped" Middle-East crude oil having a gravity of 11.0° API and containing about 10.1 percent by weight of asphaltenes and 5.2 percent by weight of sulfur; and, a vacuum residuum having a gravity of 8.8° API, containing 3.0 percent by weight of sulfur and 4,300 ppm by weight of nitrogen.

Candor compels recognition of the fact that many slurry-type processes have been proposed for the catalytic conversion of hydrocarbons. Regardless of the various operating and processing techniques, the principal areas which have confronted those skilled in the art include the separation of the effluent to provide substantially catalyst-free distillable product, the uninterrupted catalyst recirculation, and the continuous, smooth, unimpeded flow of the reactants and the slurry catalyst through the entire process and particularly in the reaction zone.

U.S. Pat. No. 3,622,498 (Stolfa et al), incorporated herein by reference, is a representative example of the prior art teachings in the area of slurry catalyst processing of heavy hydrocarbonaceous oil. The Stolfa et al patent teaches that an asphaltene-containing hydrocarbonaceous charge stock may be converted by forming a reactive slurry of the asphaltene-containing hydrocarbonaceous charge stock, hydrogen and a finely divided catalyst containing at least one metal component from the metals of Group V-B, VI-B or VIII; and reacting the resulting slurry in a reaction chamber at conditions including a pressure above about 1,000 psig and a temperature above about 800° F.

Those skilled in the art of hydrocarbon processing have not recognized that under certain conditions which are commonly encountered in slurry catalyst processing of asphaltene-containing hydrocarbons, that the reaction zone may contain foam which reduces the efficiency of the slurry conversion process. Since the foaming problem in the reaction zone of a slurry catalyst process has not previously been known to the art, the solution to the problem, of course, has also not been known. We have discovered that foaming is a significant problem in the slurry conversion process and that the efficiency of a catalyst slurry process is enhanced when the amount of foam is minimized, thereby enabling full utilization of the reaction zone. The black oil typically utilized in a slurry catalyst process is particularly susceptible to the formation of foam when subjected to the necessary hydrocarbon conversion conditions. The present invention achieves the full utilization of the reaction zone by the addition of antifoamant as hereinafter described, thereby reducing any foaming tendency and thereby improving process stability and efficiency.

SUMMARY OF THE INVENTION

The present invention relates to a process which is utilized to effect the continuous decontamination or conversion of asphaltenic black oils by providing a slurry process utilizing a finely-divided, unsupported metal catalytic component and an antifoamant.

Accordingly, in one embodiment, the invention is a process for the conversion of a hydrocarbonaceous black oil comprising asphaltenes and indigenous trace metal wherein the black oil is admixed with a finely divided, unsupported metal catalyst in the presence of hydrogen and antifoamant at hydrocarbon conversion conditions in a hydrocarbon conversion zone.

Other embodiments of the present invention encompass further details such as process streams, particular operating conditions and techniques, and type and concentration of antifoamant, all of which are hereinafter disclosed in the following discussion of each of these facets of the invention.

DETAILED DESCRIPTION OF THE INVENTION

The present invention is a process for the conversion of a hydrocarbonaceous black oil comprising asphaltenes and indigenous trace metal wherein the black oil is admixed with a finely divided, unsupported metal catalyst in the presence of hydrogen and antifoamant at hydrocarbon conversion conditions in a hydrocarbon conversion zone.

The feedstocks suitable for the conversion process in accordance with the invention include hydrocarbonaceous black oil derived from any source such as petroleum, shale, tar sand, and coal liquefaction processes, including coal liquefaction bottoms.

The most suitable hydrocarbonaceous black oil feedstocks contain asphaltenes and indigenous trace metal.

The most common metallic contaminants are nickel and vanadium, although other metals including iron, copper, etc., may also be present. These metals may occur in a variety of forms. They may exist as metal oxides or sulfides introduced into the crude oil as metallic scale or similar particles, or they may be present in the form of soluble salts of such metals. Usually, however, they exist in the form of stable organometallic compounds such as metal porphyrins and the various derivatives thereof. Although the metallic contaminants existing as oxide or sulfide scale may be removed, at least in part, by relatively simple filtering techniques, and the water-soluble salts are at least in part removable by washing and subsequent dehydration, a more severe treatment is required to remove the stable organometallic compounds, such as metal porphyrins, before the hydrocarbonaceous black oil is suitable for further processing. Notwithstanding that the concentration of these organometallic compounds may be relatively small, for example, often less than about 10 ppm calculated as the elemental metal, subsequent processing techniques are adversely affected thereby. For example, when a hydrocarbon charge stock containing metals in excess of about 3 ppm, is subjected to fluid catalytic cracking, the metals become deposited upon the catalyst, thereby altering the composition thereof to the extent that undesirable by-products are formed. That is to say, the composition of the catalyst composite, which is closely controlled with respect to the nature of the charge stock being processed and the quality and quantity of the product desired, is considerably changed as a result of the metal deposition thereon during the course of the cracking process.

Additionally, the black oil feedstocks generally contain considerable quantities of pentane-insoluble materials present in the form of a suspension or dispersion. These pentane-insoluble materials, described as asphaltenes, are a carbonaceous material considered to be coke precursors having a tendency to become immediately deposited within conventional reaction zones and on the catalytic composite as a gummy hydrocarbonaceous residue. It is further considered that asphaltenes contain the bulk of the difficultly removable metal contaminants as well as a considerable portion of the undesirable nitrogenous and sulfur compounds.

The use of a finely divided, unsupported metal catalyst in a slurry process for the conversion of hydrocarbonaceous black oils is a facile technique for the processing and conversion of feedstocks which contain asphaltenes and indigenous trace metal. However, we have discovered that during the slurry catalyst processing of hydrocarbonaceous black oils, the flowing reactants in the conversion zone tend to induce foam formation. Any such foam occupies space in the conversion zone and thereby reduces the efficiency of the reaction or conversion process. Furthermore, we have discovered that the conversion zone foam may be reduced or eliminated by the addition of an appropriate antifoam agent or antifoamant with the concurrent increase in the residence time of the reactants in the conversion zone as well as the conversion rate.

Accordingly, the present invention utilizes an antifoamant to improve the process of converting hydrocarbonaceous black oils. There are many examples of materials which prevent foam formation or destroy foams. Most antifoaming agents and defoamers are insoluble in the foaming liquid. One mode of action considers that defoaming takes place by a spreading of the additive at the gas-liquid interface and displacement of the foaming agent from the film. The displacement by preferential adsorption forms an interface that lacks the film elasticity necessary for maintenance of persistent foams. Sometimes an additive need not be insoluble in the foaming liquid to be an effective antifoaming agent or defoamer; this may involve other modes of action. In practice, compounds which are effective for various applications have been largely developed empirically. Although we do not wish to be bound by any theory, the hereinable discussion is presented to aid in the selection of an antifoamant for use in a particular situation. Suitable antifoamants for the present invention may be selected from the myriad antifoamants which are presently available and demonstrate the requisite antifoaming ability. Some of the most effective and versatile antifoaming agents are among the silicones, for example, dimethyl silicone (polydimethyl siloxane). Further guidance for the selection of the antifoamant, which is an essential component of the present invention, is that the antifoamant must be compatible with the conditions encountered in the reaction zone and which conditions include a temperature up to about 800° F. or more. Therefore, any component which displays an antifoamant function and is highly resistant to any undesirable degradation may be utilized according to the method of the present invention. Preferred antifoamants include those selected from the silicones, such as the dialkyl siloxane polymers, polydimethyl siloxane, the polydiphenyl siloxanes, the polydiphenyl dimethyl siloxanes, and the fluorinated siloxanes.

The antifoamant is to be present in effective amounts and is preferably incorporated with the reactants in a concentration which is generally well below about 5 weight percent based on the hydrocarbonaceous charge stock and more preferably in a concentration within the range from about 0.0001 to about 1 weight percent.

The process of the present invention also utilizes a finely divided catalyst. Although the present invention is not limited to the use of any particular, finely divided, solid catalyst, the catalytically active metal component of the catalyst must possess cracking and/or hydrogenation activity. Thus, in most applications of the present invention, the catalytically active metallic component will be selected from the metals of Group V-B, VI-B and VIII of the Periodic Table. Of these, preferred metallic components are vanadium, chromium, iron, cobalt, nickel, niobium, molybdenum, tantalum and tungsten; the noble metals of Group VIII are not generally considered for use in a slurry-type process, particularly in view of economic considerations. Recent investigations and developments in catalytic slurry processing of heavy hydrocarbonaceous charge stock have indicated that the sulfides of the foregoing metals, and particularly those of Group V-B, offer more advantageous results. For this reason, a preferred unsupported catalyst comprises a metal sulfide selected from tantalum, niobium and vanadium sulfides, the latter being particularly preferred. The finely divided, unsupported metal catalyst has a nominal diameter or particle size of at least one millimicron with a preferred range from about 0.1 micron to about 2000 microns and with a more preferred range from about 0.1 micron to about 100 microns. In the interest of brevity, the following discussion will be limited to the use of vanadium sulfides as the catalyst optionally employed in the present slurry process.

The vanadium sulfides may be prepared in any convenient manner, the precise method not being essential to the present invention. For example, vanadium pentoxide may be reduced with sulfur dioxide and water to yield a solid hydrate of vanadyl sulfate. The latter is treated with hydrogen sulfide at a temperature of about 572° F. to form vanadium tetrasulfide. Reducing the vanadium tetrasulfide in hydrogen at a temperature above about 572° F. produces the vanadium sulfide which is then slurried into the system.

The preferred concentration of vanadium sulfides slurried with the hydrocarbonaceous material charged to the reaction chamber, is within the range of from about 0.01% to about 10% by weight, calculated as the elemental metal. Excessive concentrations do not appear to enhance the results, even with extremely contaminated charge stocks having exceedingly high asphaltene concentrations. More preferred concentrations of vanadium sulfides are within the range of from about 0.1% to about 6% by weight. It should be noted that vanadium forms a multiplicity of sulfides, some of which are non-stoichiometric. Examples of various sulfides of vanadium include $VS$, $VS_2$, $V_2S_3$, $VS_4$, $VS_3$, $V_4S_5$, and $V_2S_5$. During the reactions, the vanadium sulfide prepared as hereinabove set forth, is converted to one or more of these forms, or some other form.

The catalyst may be recovered or separated by a series of filtration or solvent extraction techniques. The solvents may be employed to remove residual, soluble hydrocarbons from the catalyst sludge. Suitable solvents include benzene, toluene, etc.

Hydrogen is an essential reactant in the conversion of asphaltene-containing hydrocarbons and is usually present in the reaction zone in an amount from about 500 to 150,000 standard cubic feet per barrel (SCFB) of normally liquid hydrocarbon feed and preferably from about 5000 to about 30,000 SCFB.

Preferably, the hydrocarbonaceous black oil comprising asphaltene and indigenous trace metal, a finely divided, unsupported metal catalyst, hydrogen and antifoamant are processed continuously in a reaction vessel at a flow rate which results in a liquid hourly space velocity of about 0.05 to about 10, where the liquid hourly space velocity is defined as the volumetric flow of the feed per hour divided by the volume of the reactor. Other reaction conditions include a temperature from about 500° F. to about 950° F., and a pressure from about 1000 psig to about 3000 psig. The hydrogen is circulated to the reaction vessel at a rate of about 3000 to about 30,000 SCFB of fresh feed. The catalyst is preferably present in an amount from about 0.01 to about 10 weight percent based on the elemental metal and the fresh feedstock, and the antifoamant is preferably present in an amount from about 0.0001 to about 1 weight percent based on the fresh feedstock.

The following illustrative embodiment is given to illustrate further the improved process of the present invention for the conversion of asphaltene-containing hydrocarbonaceous feedstocks. It is understood that this illustrative embodiment is to be illustrative rather than restrictive. Specific operating conditions, processing techniques, catalyst compositions, antifoamant and the other individual process details are presented for description but it is not intended that the invention be limited to the specific illustrations, nor is it intended that a given process be limited to the particulars mentioned.

ILLUSTRATIVE EMBODIMENT

A small scale laboratory plant is selected to conduct the experiments relating to the conversion of a topped crude oil having the characteristics presented in Table I in a slurry process utilizing a vanadium sulfide catalyst. This laboratory plant has the ability to operate in a continuous mode of operation as opposed to a batch operation. The experiments are conducted with the hereinabove described topped crude oil containing 4 weight percent vanadium sulfide slurry catalyst in a reaction zone having a 0.3 liquid hourly space velocity based on fresh feed, a 10,000 standard cubic feet per barrel of hydrogen circulation, a temperature of 790° F. and a pressure of 2000 psig.

The first run is initiated and the plant is operated at the hereinabove described conditions. After the crude oil conversion operation is initiated and has sufficient time to obtain steady state, the asphaltene conversion is found to be 36 percent.

The second run is performed in the same manner as hereinabove described with the exception that an antifoamant in an amount of 0.1 weight percent based on the topped crude oil is added to the oil prior to its introduction into the plant. In this case, the antifoamant is polydimethyl siloxane. After steady state operation is achieved, the asphaltene conversion is found to be 53 percent.

The results of these two runs are presented in Table II.

TABLE I

| Inspection of Reduced Crude Oil | |
|---|---|
| Gravity, °API | 6.5 |
| Distillation, °F. | |
| IBP | 636 |
| 10 | 781 |
| 20 | 856 |
| 30 | 938 |
| 35 | 985 |
| Heptane Insolubles, Vol. % | 16.8 |
| Metals Content, Wt. PPM | |
| Vanadium | 1400 |
| Nickel | 130 |
| Iron | 140 |

TABLE II

| Summary of the Illustrative Embodiment Results | | |
|---|---|---|
| Run | 1 | 2 |
| Temperature, °F. | 790 | 790 |
| Hydrogen Circulation Rate, SCFB | 10,000 | 10,000 |
| Liquid Hourly Space Velocity, Fresh Feed | 0.3 | 0.3 |
| Pressure, PSIG | 2000 | 2000 |
| Vanadium Sulfide Catalyst Concentration, Wt. % | 4 | 4 |
| Antifoamant | No | Yes |
| Asphaltene Conversion, Vol. % | 36 | 53 |

The foregoing specification and illustrative embodiment clearly illustrate the improvements encompassed by the present invention and the benefits to be afforded an improved slurry process for the conversion of hydrocarbonaceous charge stocks.

We claim:

1. In a process for the conversion of a hydrocarbonaceous black oil comprising asphaltenes and indigenous trace metals wherein a slurry of said black oil and a finely divided, unsupported metal catalyst is subjected to hydrocarbon conversion conditions in the presence of hydrogen in a hydrocarbon conversion zone, thereby causing the formation within said conversion zone of foam which impairs the efficiency of the conversion process, the method of reducing or eliminating said foam formation in the conversion zone which comprises introducing to said zone containing the black oil-catalyst slurry from about 0.001 to about 1 weight percent, based on the weight of said black oil, of a silicone antifoaming agent to mitigate foaming in the conversion zone.

2. The process of claim 1 wherein said indigenous trace metal comprises nickel, vanadium, iron or a mixture thereof.

3. The process of claim 1 wherein said finely divided, unsupported metal catalyst comprises vanadium, molybdenum, nickel or compounds thereof.

4. The process of claim 1 wherein hydrocarbon conversion conditions include a pressure from about 1000 psig to about 3000 psig, a temperature from about 500° F. to about 950° F., a liquid hourly space velocity from about 0.05 to about 10, a hydrogen circulation rate from about 3,000 to about 30,000 SCFB, and a catalyst concentration from about 0.01 to about 10 weight percent based on the weight of the elemental metal and fresh feedstock.

5. The process of claim 1 wherein said finely divided, unsupported metal catalyst has a nominal diameter or particle size from about 0.1 micron to about 100 microns.

6. The process of claim 1 wherein said hydrocarbonaceous black oil comprises atmospheric tower bottoms, vacuum column bottoms, crude oil residuals, coal oil extracts, tar sand oil, shale oil, or deasphalter pitch.

* * * * *